US012037926B2

(12) United States Patent
Kury et al.

(10) Patent No.: US 12,037,926 B2
(45) Date of Patent: Jul. 16, 2024

(54) ROTOR COMPRISING A ROTOR COMPONENT ARRANGED BETWEEN TWO ROTOR DISCS

(71) Applicant: Siemens Energy Global GmbH & Co. KG, Bayern (DE)

(72) Inventors: Peter Kury, Essen (DE); Mirko Milazar, Oberhausen (DE); Christopher W Ross, Oviedo, FL (US); Yulia Bagaeva, Leningradskaya obl. (RU); Karsten Kolk, Mülheim a.d. Ruhr (DE); Ivan Lbov, Saint-Petersburg (RU); Alexander Romanov, Sankt-Petersburg (RU); Harald Hoell, Wächtersbach (DE); Kevin Kampka, Mülheim a. d. Ruhr (DE); Rene Mahnke, Mülheim a. d. Ruhr (DE); Andreas Andreas, Berlin (DE); Daniel Hofsommer, Teltow (DE); Ekkehard Maldfeld, Fort Mill, SC (US); Jörg Richter, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/767,883

(22) PCT Filed: Jun. 18, 2020

(86) PCT No.: PCT/EP2020/066858

§ 371 (c)(1),
(2) Date: Apr. 9, 2022

(87) PCT Pub. No.: WO2021/073786

PCT Pub. Date: Apr. 22, 2021

(65) Prior Publication Data

US 2024/0084708 A1 Mar. 14, 2024

(51) Int. Cl.
*F01D 5/00* (2006.01)
*F01D 5/30* (2006.01)

(52) U.S. Cl.
CPC ...... *F01D 5/3015* (2013.01); *F05D 2230/642* (2013.01); *F05D 2260/37* (2013.01)

(58) Field of Classification Search
CPC . F01D 11/00; F01D 5/06; F01D 5/066; F05D 2260/30; F05D 2260/36; F05D 2260/37
See application file for complete search history.

(56) References Cited

U.S. PATENT DOCUMENTS 2,656,147 A * 10/1953 Denison ................ F01D 11/001 416/198 A
4,645,424 A * 2/1987 Peters .................. F01D 11/001 416/198 A (Continued)

FOREIGN PATENT DOCUMENTS

CN 1853032 A 10/2006
CN 101779000 A 7/2010

(Continued)

OTHER PUBLICATIONS

PCT International Search Report and Written Opinion of International Searching Authority mailed Jan. 10, 2020 corresponding to PCT International Application No. PCT/EP2020/066858 filed Jun. 18, 2020.

(Continued)

*Primary Examiner* — Matthew T Largi
(74) *Attorney, Agent, or Firm* — Wolter Van Dyke Davis, PLLC

(57) ABSTRACT

A rotor of a gas turbine having two adjacent rotor discs, on each of which moving blades are fastened, an annular rotor component being arranged between the rotor discs and having at its opposite ends circumferential annular grooves, in each of which a circumferential fastening projection on (Continued)

the respective rotor disc engages. When the rotor is stationary a first outer flank of the first annular groove rests under pressure against a first outer flank of the first fastening projection and there is play between a first inner flank of the first annular groove and a first inner flank of the first fastening projection.

17 Claims, 5 Drawing Sheets

(56) References Cited

U.S. PATENT DOCUMENTS

| | | | | |
|---|---|---|---|---|
| 4,659,285 | A | 4/1987 | Kalogeros et al. | |
| 4,659,289 | A * | 4/1987 | Kalogeros | F01D 5/3015 416/198 A |
| 4,669,959 | A * | 6/1987 | Kalogeros | F01D 5/3015 416/198 A |
| 4,743,164 | A * | 5/1988 | Kalogeros | F01D 11/008 416/193 A |
| 4,820,119 | A | 4/1989 | Joyce | |
| 5,622,475 | A | 4/1997 | Hayner | |
| 8,459,951 | B2 * | 6/2013 | Arrell | F04D 29/053 415/199.4 |
| 8,511,976 | B2 * | 8/2013 | Cummins | F01D 11/003 415/199.5 |
| 2002/0067987 | A1 | 6/2002 | Toborg | |
| 2007/0025841 | A1 | 2/2007 | Milazar | |
| 2007/0237645 | A1 | 10/2007 | Garin | |
| 2008/0044278 | A1 | 2/2008 | Paprotna | |
| 2011/0318184 | A1 | 12/2011 | Arrell | |
| 2012/0034087 | A1 | 2/2012 | Dungs | |
| 2012/0211944 | A1 | 8/2012 | Nishimoto | |
| 2012/0237342 | A1 | 9/2012 | Berche | |
| 2013/0236289 | A1 | 9/2013 | Liotta et al. | |
| 2014/0255169 | A1 | 9/2014 | Muller | |
| 2015/0086361 | A1 | 3/2015 | Ahmad | |
| 2015/0114001 | A1 | 4/2015 | Potter et al. | |
| 2016/0032747 | A1 | 2/2016 | Bez | |
| 2016/0130948 | A1 | 5/2016 | Costamagna | |
| 2021/0310359 | A1 * | 10/2021 | Kury | F01D 5/3015 |

FOREIGN PATENT DOCUMENTS

| | | | |
|---|---|---|---|
| CN | 102378850 | A | 3/2012 |
| CN | 102667066 | A | 9/2012 |
| CN | 104285040 | A | 1/2015 |
| CN | 104564173 | A | 4/2015 |
| CN | 204627758 | U | 9/2015 |
| CN | 105051351 | A | 11/2015 |
| DE | 19940556 | A1 | 3/2001 |
| DE | 102014115197 | A1 | 4/2015 |
| EP | 0169800 | A1 | 1/1986 |
| EP | 2639409 | A2 | 9/2013 |
| EP | 3287595 | A1 | 2/2018 |
| EP | 3348786 | A1 | 7/2018 |
| JP | H01501808 | A | 6/1989 |
| JP | 2016524082 | A | 8/2016 |
| RU | 2151883 | C1 | 6/2000 |
| WO | 2005095763 | A1 | 10/2005 |
| WO | 2012039386 | A1 | 3/2012 |

OTHER PUBLICATIONS

Lu Xingen, Chu Wuli, Zhang Yanfeng; Numerical Investigation of Interaction Between Casing Treatment and Tip Leakage Flow in a Transonic Compressor Rotor, Journal of Xi'an Jiaotong University, Nov., 2006; 123-126, 130; Nr. 11; Xi'an, Shaanxi, China [English abstract on p. 1].

Wang; "Key technical transformation of M701F3 gas turbine seal retaining ring"; China Power; vol. 48, No. 2, May 2, 2015, Article ID: 1004-9649 (2015) 02-0027-04; 2015; English abstract p. 5.

Wang; "Characteristic Analysis of Typical Matching Relationship of Rotor Disk Under Sustained High Acceleration Loading Condition"; School of Logistics, Beijing Wuzi University, Beijing; vol. 34 Issue 4, ISBN 1009-0134(2012)40087-05; 2012; 34; English abstract attached.

* cited by examiner $T_{01,11,21} = T_0$ $\omega_0 = 0$ $T_0 < T_{01,11,21} << T_N$ $0 < \omega_1 < \omega_2$ $T_0 < T_{01,11} < T_{21} < T_N$ $\omega_1 < \omega_2 < \omega_N$ $T_{01,11,21} = T_N$ $\omega = \omega_N$ $T_{01} = T_0$ $T_{01} < T_{21}$ $T_{01} = T_0$ $T_{01} < T_{21}$ $T_{01} = T_0$ $T_{01} < T_{21}$ $T_{01} = T_{21} = T_0$

ROTOR COMPRISING A ROTOR COMPONENT ARRANGED BETWEEN TWO ROTOR DISCS

CROSS REFERENCE TO RELATED APPLICATIONS

This application is the US National Stage of International Application No. PCT/EP2020/066858 filed 18 Jun. 2020, and claims the benefit thereof. The International Application claims the benefit of U.S. Provisional Application No. 62/916,811 filed 18 Oct. 2019. All of the applications are incorporated by reference herein in their entirety.

FIELD OF INVENTION

The invention relates to a rotor of a gas turbine, which rotor has at least two interconnected rotor disks, between which an annular rotor component is arranged.

BACKGROUND OF INVENTION

Various designs of rotor for use in gas turbines with interconnected rotor disks are known from the prior art, wherein an annular rotor component is arranged between the rotor disks for the purpose of shielding the inner region of the rotor from the hot gas which flows through the gas turbine. The two rotor disks here each have a plurality of rotor blades distributed over the outer circumference. A row of guide blades arranged distributed over the circumference which are in each case fastened to the stationary housing is situated between the two rows of rotor blades. A gap is necessarily present here between the guide blades and the rotor blades because of the rotation of the rotor. This could in principle enable the ingress of hot gas into the region radially inside the guide blades. In order to hold back the hot gas from inside the rotor, in some gas turbines an annular rotor component is arranged between the two adjacent rotor disks. For this purpose, this rotor component is mounted on both sides of the rotor disk.

The rotor component fundamentally has the sole object of preventing the penetration of hot gas. A further function does not generally exist. Accordingly, the mounting of the rotor component is maintained simply in a customary fashion, wherein only one annular, axially extending shoulder engages in a corresponding annular groove.

In order to ensure the position of the rotor component between the two rotor disks, it is generally provided that the rotor component is mounted with a press fit on either side of the respective rotor disk. At the location of the press fit, the rotor component is customarily arranged relative to the rotor disk, on the side pointing toward the rotor axis. This is due in particular to the fact that, when centrifugal forces occur, the rotor component is subject to greater deformation than the rotor disks which are, by contrast, of solid design.

Although the customary embodiment from the prior art has proven successful, different thermal expansions at the rotor disks and the rotor component may occur depending on the configuration of the press fit and the possible elastic deformations during the heating up of the gas turbine or during the cooling of the gas turbine. Said different thermal expansions may lead, under some circumstances, to the compressive stress in the press fit being lost. By contrast, the combination of the provided press fit with the deformations under the centrifugal forces because of rotation of the rotor leads to possibly impermissibly high compressive stresses.

SUMMARY OF INVENTION

It is therefore the object of the present invention to ensure the position of the rotor component, even during the heating and cooling of the gas turbine, without the permissible stresses at the rotor component and at the rotor disks being exceeded.

The object set is achieved by an embodiment according to the invention of a rotor according to the teaching of the independent claim. Advantageous embodiments are the subject matter of the dependent claims. A method for installing the rotor is specified in a further claim.

The rotor of the type in question first of all serves for use in a gas turbine. However, it is also possible, independently thereof, to use the embodiment of the rotor in a different turbo machine, for example in a steam turbine.

The rotor at least has a first rotor disk and a second rotor disk connected directly and fixedly to the first rotor disk. The rotor disks each have, distributed on the outer circumference, a plurality of blade retention grooves penetrating the respective rotor disk axially. The blade retention grooves serve here for receiving rotor blades.

Furthermore, the first rotor disk has an encircling first fastening projection, which extends axially toward the second rotor disk, radially below the blade retention grooves. Similarly, the second rotor disk has an encircling second fastening projection, which extends axially toward the first rotor disk, radially below the blade retention grooves.

A ring-shaped rotor component is arranged between the two rotor disks in the region of the blade retention grooves and/or radially below the blade retention grooves. Said rotor component surrounds the rotor, which is partially situated inside the rotor component, or surrounds portions of the two rotor disks. For the purpose of centering the rotor component relative to the rotor disks and at the same time for fastening said rotor component, the rotor component has, at an axial end, an encircling, axially opening first annular groove and, axially opposite, an encircling, axially open second annular groove. The first fastening projection of the first rotor disk engages here in the first annular groove and the second fastening projection of the second rotor disk engages in the second annular groove.

According to the invention, a defined position of the rotor component is now ensured without impermissibly high stresses occurring, by, in a standstill state of the rotor, in which the rotor is substantially at room temperature, a contact pressure against the outer circumference of the first fastening projection being provided. Accordingly, a first groove outer flank of the first annular groove bears under contact pressure against a first projection outer flank of the first fastening projection. By contrast, it is required that, in the standstill state at room temperature, a clearance is present radially opposite between a first groove inner flank of the first annular groove and a first projection inner flank of the first fastening projection (04).

By means of the arrangement according to the invention of the press fit in the standstill state of the rotor, in which the rotor as a whole is at room temperature, an impermissible increase in the compressive stress when centrifugal forces occur is avoided on the radially outer side with respect to the fastening projection on the first rotor disk.

It is particularly advantageous here if the connection of the rotor component to the second rotor disk is substantially stress-free at room temperature when the rotor is at a standstill. For this purpose, a clearance has to be present between a second groove outer flank of the second annular groove and a second projection outer flank of the second fastening projection, and a clearance has to be present between a second groove inner flank of the second annular groove and a second projection inner flank of the second fastening projection.

For an advantageous coordination with regard to the fastening of the rotor component between the rotor disks and the compressive stresses which occur taking into consideration rotation of the rotor during the starting up of the gas turbine with the associated expansions of the rotor component and the rotor disks, it is particularly advantageous if, in a first transition state in the presence of a first rotational speed of the rotor, a change is made of the fastening state from the first rotor disk to the second rotor disk. The first rotational speed is lower here than the nominal rotational speed at which the rotor is operated as intended. In this first transition state, there is contact, without any reduction, of the first groove outer flank against the first projection outer flank, wherein there is also contact of the second groove inner flank against the second projection inner flank. By contrast thereto, a clearance remains, without any reduction, between the first groove inner flank and the first projection inner flank, and a clearance remains, without any reduction, between the second groove outer flank (35) and the second projection outer flank.

The first rotational speed here is advantageously greater than 0.2 times the nominal rotational speed. By contrast, the design is intended to make provision for the first rotational speed to be lower than 0.6 times the nominal rotational speed. For the design of the transition state, it can be assumed that both the rotor disks and the rotor component are approximately at the same temperature which approximately corresponds to room temperature or lies thereabove, but is significantly far from the operating temperature.

By means of the corresponding determination of the diameters of the opposite fastening projections and of the annular grooves, the position of the rotor component relative to the rotor disks during the starting up of the gas turbine can advantageously be ensured. As the rotational speed increases and the rotor component expands to a relatively large extent relative to the rotor disks, the contact pressure between the first projection outer flank and the first groove outer flank decreases, with contact being produced between the second groove inner flank and the second projection inner flank. To this extent, a change is made in the first transition state from fixing the rotor component on the first rotor disk to fixing the rotor component on the second rotor disk.

Moreover, it is advantageous if, in a second transition state in the presence of a second rotational speed of the rotor, the fixing of the rotor component is taken over by the second rotor disk. The second rotational speed is higher here than the first rotational speed, but lower than the nominal rotational speed of the turbo machine. Accordingly, there is contact pressure between the second groove inner flank and the second projection inner flank. By contrast, a clearance is presence between the further contact surfaces, i.e. between the first groove outer flank and the first projection outer flank, and between the first groove inner flank and the first projection inner flank, and between the second groove outer flank and the second projection outer flank.

In order to design the second transition state, a second rotational speed which corresponds to at least 0.8 times the nominal rotational speed can advantageously be assumed.

In the second transition state, the components are at a second transition temperature. When the gas turbine is started up and all of the components heat up, the rotor component conventionally heats up significantly more rapidly, because of the smaller mass, than the more solid rotor disks. Accordingly, the second transition temperature is characterized in that the rotor component has approximately reached the operating temperature while, by contrast, the rotor disks are at a temperature which is significantly lower, for example by approx. 30%, in relation to the operating temperature.

Both for the secure mounting of the rotor component between the two rotor disks and for the support of the rotor component on the rotor disks, it is particularly advantageous if, at the intended nominal rotational speed, there is support on both sides of the rotor component. For this purpose, the first groove inner flank has to lie under contact pressure against the first projection inner flank and the second groove inner flank has to lie under contact pressure against the second projection inner flank. By contrast, a gap is present on the radially outer side, that is to say a clearance is present between the first groove outer flank and the first projection outer flank, and a clearance is present between the second groove outer flank and the second projection outer flank. Therefore, both the secure position of the rotor component and load absorption of the centrifugal force are ensured on both sides.

An advantageous installation of the rotor component in the rotor is made possible if the diameter of the first annular groove is defined at a suitable ratio to the diameter of the first fastening projection. It is particularly advantageous here if, for the installation, the rotor component is heated up to an installation temperature of at least 100° C. and at maximum 200° C. while, in contrast, the rotor disks are at room temperature. Taking into consideration the corresponding expansion of the rotor component because of the temperature increase, the required size of the first annular groove in relation to the first fastening projection can be determined. It is advantageous here if, in the presence of the installation temperature, the contact pressure between the first groove outer flank and the first projection outer flank corresponds to at most 10% of the contact pressure between the two components at room temperature. It is particularly advantageous here if, by means of the installation temperature and with appropriate design of the diameters of fastening projection and annular groove, the overlap present at room temperature is substantially eliminated.

If, in the presence of the installation temperature, a clearance should arise between the first groove outer flank and the first projection outer flank, it should be noted, by contrast, that, however, no significant overlap arises on the radially inner side. Accordingly, the contact pressure between the first groove inner flank and the first projection inner flank in this case should be at most 10% of the contact pressure which is present between the first groove outer flank and the first projection outer flank at room temperature. It is advantageous in each case if, even in the presence of the installation temperature, a clearance remains between the first groove inner flank and the first projection inner flank.

In an advantageous configuration of the rotor component, the latter has a covering portion by means of which the blade retention grooves, or the blade roots of rotor blades fastened in the blade retention grooves, can be covered at least in sections. For this purpose, the covering portion has to extend in the circumferential direction and radially. The covering portion is arranged here radially outside the first annular segment groove. It is furthermore provided that the covering portion bears with a support surface axially against an end surface of the first rotor disk in the region between the blade retention grooves.

In a particularly advantageous manner, it can be provided that the rotor component has a respective covering portion axially opposite on both sides.

At least, it is furthermore advantageous if the support surface bears under contact pressure, with elastic deformation of the covering portion, against the end surface. It can therefore be ensured that, during the operation of the turbomachine, contact of the support surface against the end surface is provided in each case from the standstill state as far as the nominal rotational speed at operating temperature.

In order to achieve the advantageous contact pressure between support surface and end surface while avoiding increased installation forces, it can advantageously be provided that the rotor component is heated to an installation temperature of between 100° C. and 200° C., with which deformation of the rotor component and in particular of the covering portion is associated, and therefore, when the rotor component is positioned as intended in the region of the annular groove relative to the fastening projection, the contact pressure between the support surface and the end surface corresponds to at most 10% of the contact pressure at room temperature. This state with the deformation in particular of the covering portion in the axial direction in the region of the support surface is promoted firstly by the configuration of the rotor component, with the covering portion arranged at the axial end. Furthermore, a configuration with a smaller material thickness in the central region between the two annular grooves has an advantageous effect in respect of the desired deformation. Secondly, the desired effect can be promoted, advantageously in the region of the first annular groove, by the targeted temperature increase.

The corresponding configuration of the rotor component, in particular the determination of the diameters of the first annular groove and the second annular groove and the overlap between the support surface and the end surface taking into consideration the possible installation temperature of the rotor component firstly permits installation without too great an application of force and ensures a secure position of the rotor component between the rotor disks during operation.

Furthermore, it is advantageous if, when the rotor component is installed on the first rotor disk, a free first expansion spacing is maintained between a first projection end surface of the first fastening projection and the first groove base of the first annular groove. The first expansion spacing amounts here to at least 0.5 mm. By contrast, it can be disadvantageous if the first expansion spacing amounts to more than 5 mm. In particular, a first expansion spacing of at least 1 mm and at most 2.5 mm is particularly advantageous.

It can likewise be provided that a second expansion spacing is present between a second projection end surface of the second fastening projection and the second groove base of the second annular groove. The second expansion spacing is intended to correspond here to at most 0.2 times the first expansion spacing.

The novel configuration of the rotor component in respect of the fastening thereof between the two adjacent rotor disks leads to a novel method for installing the rotor.

First of all, the first rotor disk is to be provided. It is advantageous here if the first rotor disk is mounted horizontally, with the rotor axis oriented vertically.

In this case or subsequently, the rotor component has to be heated up to an installation temperature of at least 100° C. A temperature of 200° C. should not be exceeded here.

The rotor component then has to be attached to the first rotor disk. For this purpose, the rotor component has to be placed onto the first rotor disk in such a manner that the first annular groove is located above the first fastening projection. The rotor component can therefore be pressed onto the first rotor disk until a support surface comes into contact with an end surface of the rotor disk.

By pushing the rotor component further onto the first rotor disk with an elastic deformation of the rotor component, the desired position of the rotor component relative to the rotor disk is reached, wherein the desired position is defined by a predefined first expansion spacing between a first projection end surface of the first fastening projection and the first groove base of the first annular groove.

The rotor component can then cool, with, in the meantime, the rotor component having to be held in the position relative to the first rotor disk.

Finally, the second rotor disk can be placed or pressed onto simultaneously the first rotor disk and the rotor component. The second fastening projection engages here in the second annular groove.

BRIEF DESCRIPTION OF THE DRAWINGS

An exemplary embodiment of a rotor according to the invention is sketched in the following figures, in which.

DETAILED DESCRIPTION OF INVENTION

Figure 1:
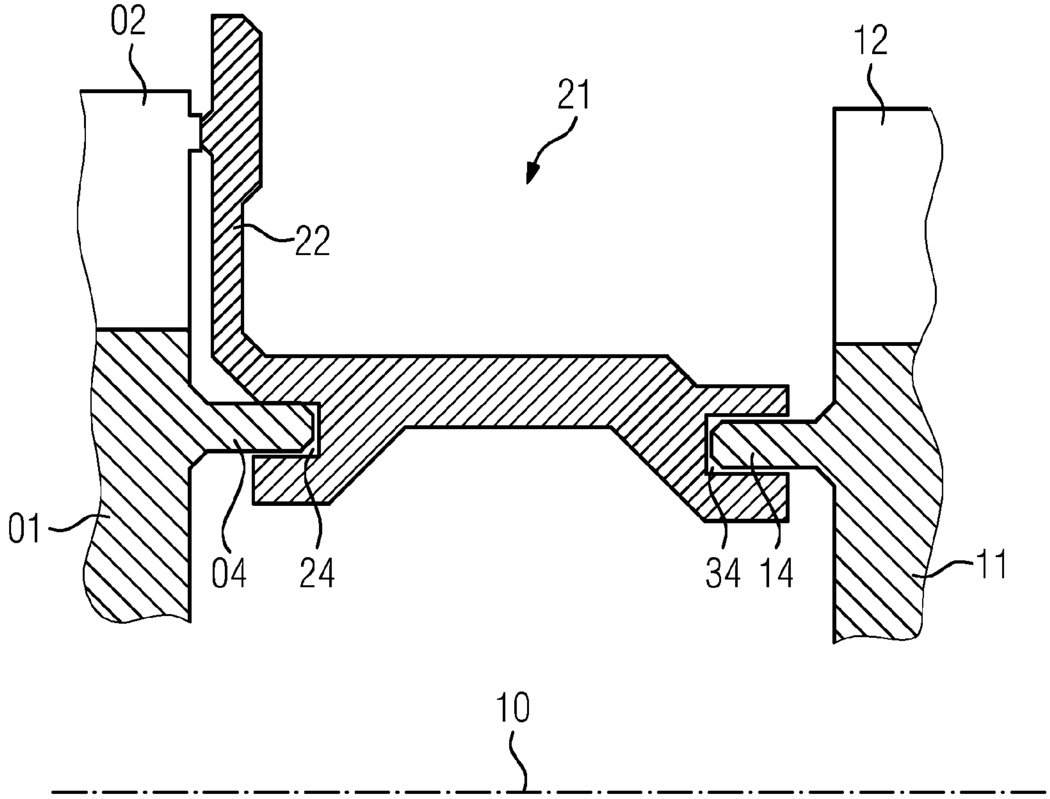
FIG. 1 shows, schematically in section, the rotor component between two rotor disks.

FIG. 1 is a schematic sketch, in a sectional illustration, of the installation of the rotor component 21 between the rotor disks 01 and 11. The rotor disks 01, 11 each have here, distributed on the outer circumference, blade retention grooves 02,12 penetrating the respective rotor disk 01, 11 axially. The blade retention grooves 02, 12 are intended for receiving rotor blades. The respective rotor disks 01, 11 each have, in turn, a fastening projection 04, 14 encircling the rotor axis 10. As can be seen, the fastening projection 04, 14 each extend axially toward the opposite rotor disk. The rotor component 21 located between the two rotor disks 01, 11 covers the intermediate space between the rotor disks 01, 11. For the fastening, the rotor component 21 has, on the axial opposite sides, a respective annular groove 24, 34, in which 24, 34 the respective fastening projection 04, 14 engages. Furthermore, the covering portion 22, which 22 extends in the circumferential direction and radially, can be seen at an axial end of the rotor component 21. Said covering portion 22 here covers the blade retention grooves 02 in the first rotor disk.

Figure 2:
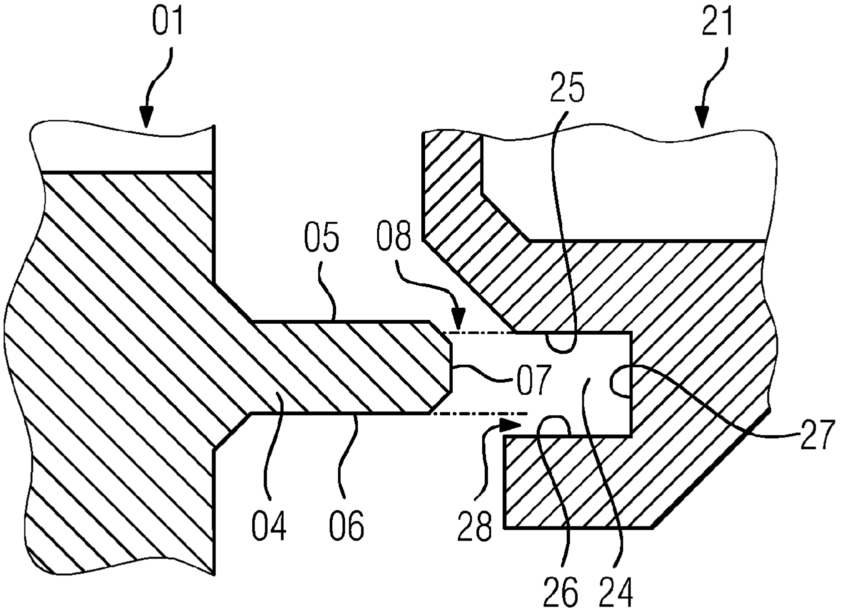
FIG. 2 shows, in detail, the press fit between the first fastening projection and the first annular groove.

The press fit between the first fastening projection 04 and the first annular groove 24 is now sketched in detail in FIG. 2. For better visibility, the rotor component 21 is illustrated axially offset for this purpose. The first rotor disk has a first projection outer flank 05 on the radially outer side of the first fastening projection 04. The first projection inner flank 06 is located on the radially opposite side. The first projection end surface 07 is located at the free end of the first fastening projection 04. Analogously thereto, the rotor component 21 has a first groove outer flank 25 on the radially outer side of the first annular groove 24 and a first groove inner flank 26 on the radially inner side. The first groove base 27 is located on the annular groove 24 opposite the first projection end surface 07. In the inoperative state of the rotor at room temperature, or after the installation of the rotor, there is a press fit between the first projection outer flank 05 and the first groove outer flank 25. This is produced because of a geometrical overlap 08 between the two corresponding components 01, 21. By contrast, on the radially opposite, inner side, a clearance 28 is present between the first projection inner flank and the first groove inner flank.

Figure 3:
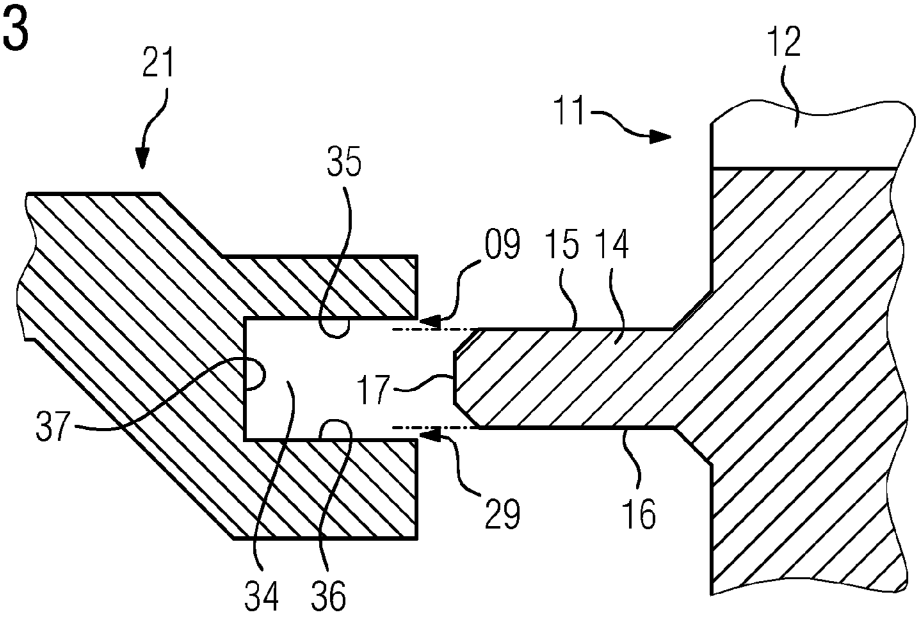
FIG. 3 shows, in detail, the clearance between the second fastening projection and the second annular groove.

FIG. 3 is a sketch in detail of the assembly between the second rotor disk 11 and the rotor component 21, with, analogously to FIG. 2, the rotor component 21 being illustrated offset. The second rotor disk 11 with, to some extent, the blade retention groove 12 and the second fastening projection 14 can in turn be seen. Said fastening projection 14 has, on the radially outer side, the second projection outer flank 15 and, radially opposite, the second projection inner flank 16 and, on the end side, the second projection end surface 17. To this end, on the rotor component 21, on the radially outer side of the second annular groove 34, the second groove outer flank 35 is located and, opposite the latter, the second groove inner flank 36, and the second groove base 37 is located opposite the second projection end surface 17. It can be seen here that there is clearance 09, 29 in the inoperative state, or after the installation, between the second fastening projection 14 and the second annular groove 34 both on the radially outer side and on the radially inner side.

In the sequence of FIGS. 4 to 7 below, the state of the rotor component 21, when installed on the two fastening projections 04, 14, is sketched when the gas turbine is started up and the rotational speed is increased to the nominal rotational speed ωN and the temperature is increased to the operating temperature TN.

Figure 4:
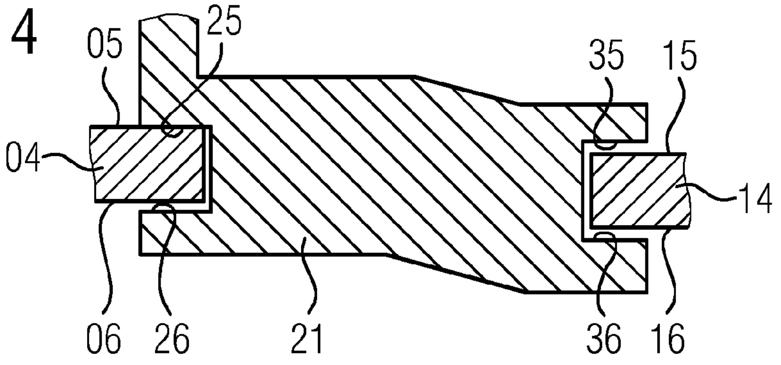
FIGS. 4-7 show the displacement of the rotor component relative to the rotor disks when starting up the gas turbine.

FIG. 4 is a sketch of the state after the installation, or in the operative state, as described previously. At the first rotor disk 01, there is the press fit on the radially outer side because of the overlap 08, while, by contrast, there is the clearance 28 on the radially inner side. There is also a free clearance 09, 29 on both sides of the second fastening projection 14.

Figure 5:
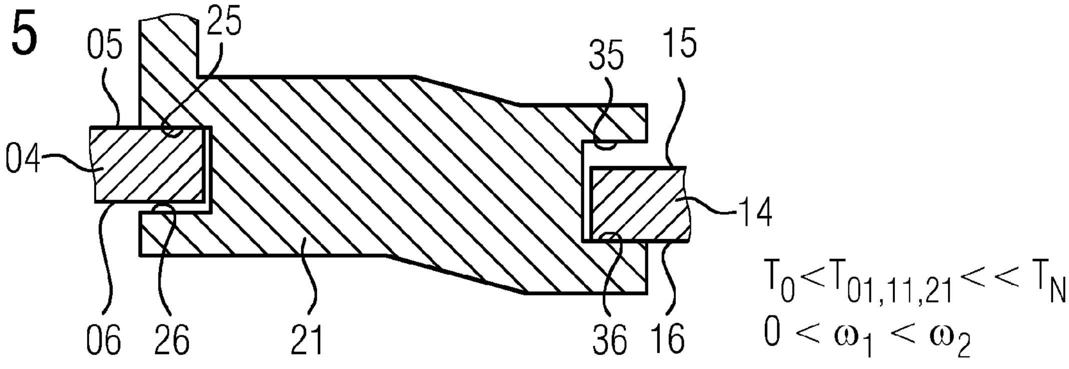
Figure 6:
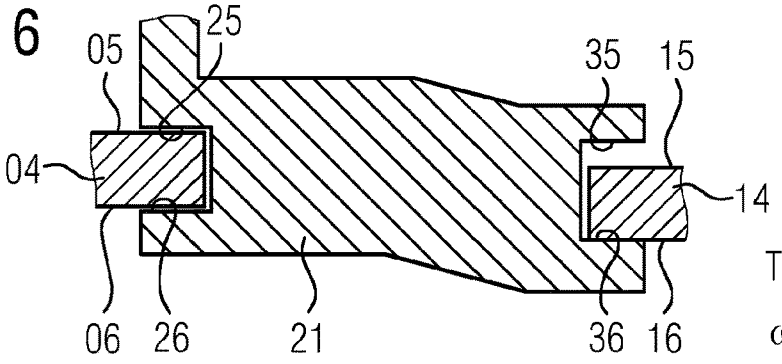

FIG. 5 now shows the first transition state as the gas turbine is started up. If the rotor is then set into motion, a first rotational speed ω1 is reached, which ω1 is still significantly below the nominal rotational speed ωN, wherein the component temperatures T01,11,21 of the rotor disks 01, 11 and of the rotor component can be increased slightly, but are still far away from the operating temperature TN. It is essential that, in the first transition state, the second groove inner flank 36 now bears against the second projection inner flank 16. Depending on the temperature T01,11,21 of the components 01, 11, 21 and clearance 29 which is present in the inoperative state, the contact takes place at different rotational speeds, with the clearance 29 advantageously being defined to a value which leads to contact at approximately 0.3 times the nominal rotational speed ωN.

When the rotational speed is increased and the temperatures of the components increase, the contact pressure between the second fastening projection 14 and the rotor component 21 on the radially inner side increases, while, by contrast, the contact pressure between the first fastening projection 04 and the rotor component 21 on the radially outer side decreases. In the second transition state, which is sketched in FIG. 6, a clearance is now produced on the radially outer side between the first fastening projection 04 and the rotor component 21. That is to say that there is a clearance between the first projection outer flank 05 and the first groove outer flank 25. In this state, the second rotational speed ω2 lies between the first rotational speed ω1 in the first transition state and the nominal rotational speed ωN, wherein the second rotational speed ω2 can approximately correspond to 0.6 times the nominal rotational speed ωN. Owing to the smaller mass of the rotor component 21 relative to the rotor disks 01, 11, said rotor component 21 heats up more rapidly when the gas turbine is started up. Accordingly, the component temperature T01,11 of the rotor disk 01, 11 is significantly lower than the component temperature T21 of the rotor component, which T21 gradually approaches the operating temperature TN.

Figure 7:
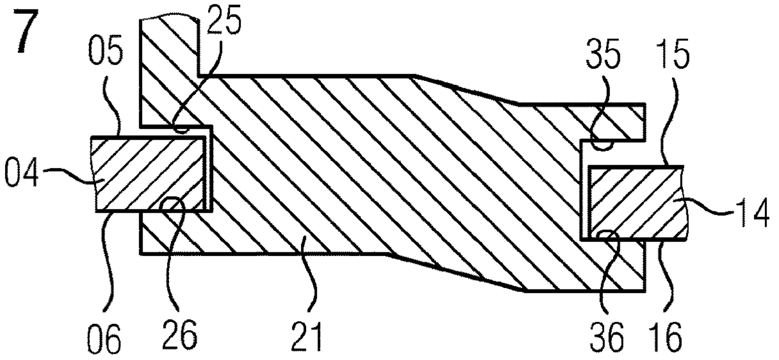

FIG. 7 shows this state when the nominal rotational speed ωN and the operating temperature TN is reached. Starting from the second transition state, with an increase in the rotational speed, the first projection inner flank 06 of the first fastening projection 04 comes into contact with the first groove inner flank 26 of the first annular groove 24.

FIGS. 8 to 11 below schematically illustrate the installation of the rotor component 21 on the first rotor disk 01. It should be noted at this juncture that, for the advantageous installation, the rotor disk 01 is oriented perpendicularly and not, as illustrated here, horizontally, and, accordingly, the rotor component 21 is located above the rotor disk 01. As described previously, it is provided that there is an overlap 08 between the first projection outer flank 05 of the first fastening projection 04 and the first groove outer flank 25 of the first annular groove 24, and therefore a press fit is produced. Furthermore, it is provided that the covering portion 22 bears with a support surface 23 against an end surface 03 of the rotor disk 01 with contact pressure. For the advantageous installation, this requires the rotor component 21 to heat up.

Figure 8:
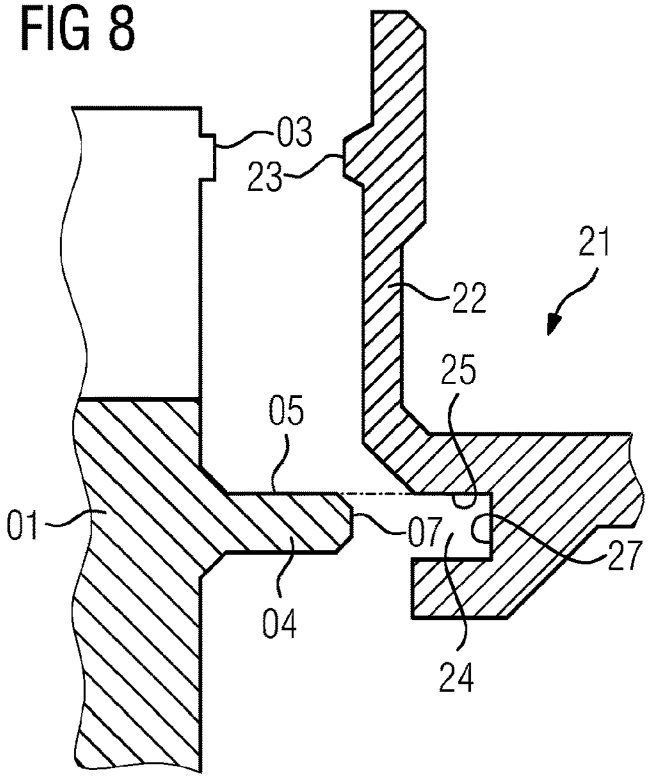
FIGS. 8-11 show the installation of the rotor component on the first rotor disk.

To this end, FIG. 8 shows the state of the rotor disk 01 and of the rotor component 21 located thereabove, wherein the rotor component 21 has been heated previously to a temperature between 100° C. and 200° C. The effect firstly achieved here is that the diameter of the first groove outer flank 25 is increased at least approximately to the diameter of the first projection outer flank 05, and therefore the rotor component 21 can be pushed onto the first fastening projection 04 without excessively great forces.

However, a further effect is obtained during the heating because of the special shaping of the rotor component 21. This effect is the deformation of the rotor component 21 to the effect that the covering portion 22 is deformed pointing away from the first rotor disk 01. The distance between the end surface 03 and the support surface 23 is accordingly increased, in contrast to the state at room temperature.

Figure 9:
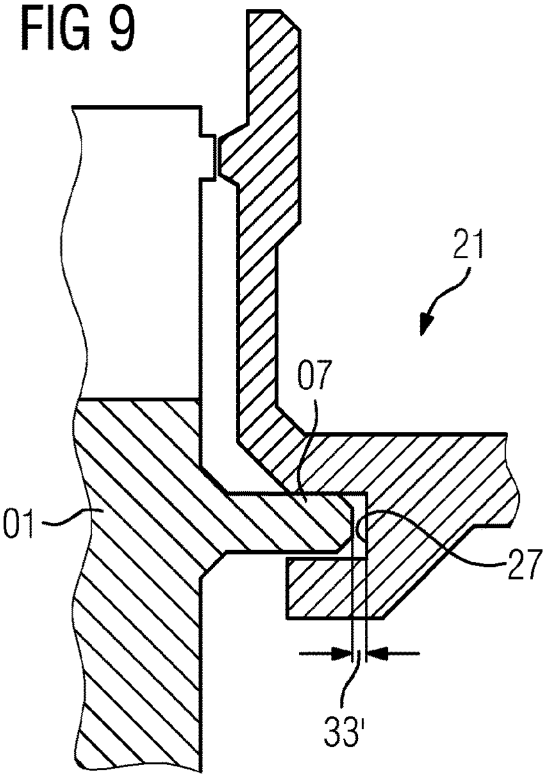

To this end, the sketch of FIG. 9 shows the position of the rotor component 21 on the rotor disk 01 after the rotor component 21 has been positioned until the support surface 23 bears against the end surface 03. An increased expansion spacing 33' remains here between the first projection end surface 07 and the first groove base 27.

Subsequently, the rotor component 21 is pressed further onto the first fastening projection 04 of the first rotor disk 01 until the previously defined expansion spacing 33 is attained—see FIG. 10. In the process, the covering portion 22 is furthermore deformed, with an initial contact pressure being produced between the support surface 23 and the end surface 03.

Figure 10:
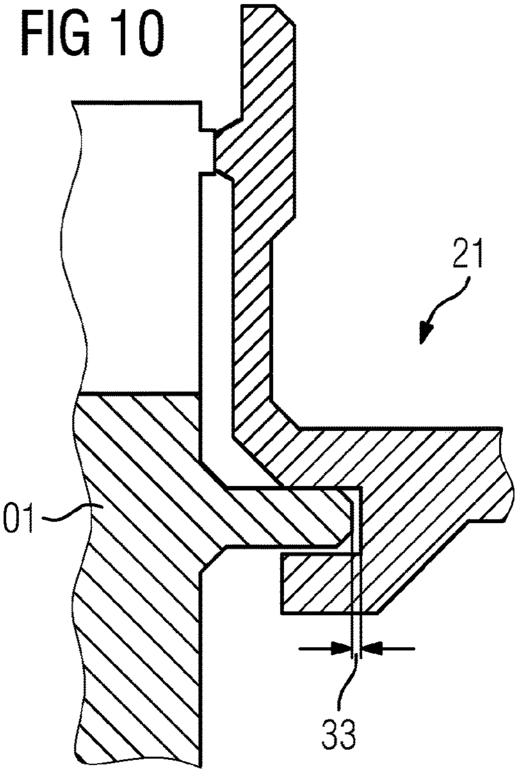
Figure 11:
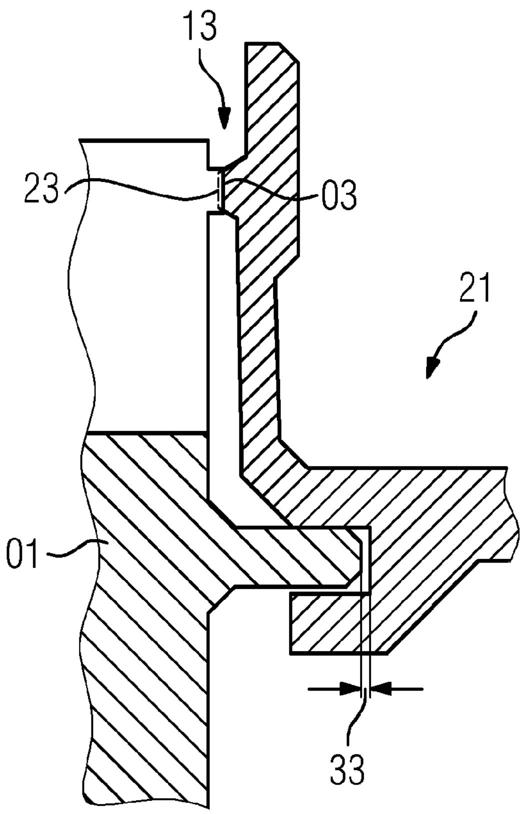

FIG. 11 now illustrates the state when, starting from the desired position, as illustrated in FIG. 10, the rotor component 21 is cooled again. It should be noted here that the expansion spacing 33 is kept constant. The temperature-induced deformation of the covering portion 22 now remains as a geometrically induced deformation with a contact pressure between the support surface 23 and the end surface 03. FIG. 11 here sketches the theoretical state with an overlap 13 between the rotor component 21 and the rotor disk 01.

LIST OF REFERENCE SIGNS

01 First rotor disk
02 First blade retention groove
03 End surface
04 First fastening projection
05 First projection outer flank
06 First projection inner flank
07 First projection end surface
08 Overlap
09 Clearance
10 Rotor axis
11 Second rotor disk
12 Second blade retention groove
13 Overlap
14 Second fastening projection
15 Second projection outer flank
16 Second projection inner flank
17 Second projection end surface
21 Rotor component
22 Covering portion
23 Support surface
24 First annular groove
25 First groove outer flank
26 First groove inner flank
27 First groove base
28 Play
29 Play
33 Expansion spacing
34 Second annular groove
Second groove outer flank
36 Second groove inner flank
37 Second groove base

The invention claimed is:

1. A rotor, comprising:
a first rotor disk which has, distributed on an outer circumference, a plurality of first blade retention grooves penetrating the first rotor disk axially and has an encircling, axially extending first fastening projection arranged, on a side pointing toward a rotor axis, below the first blade retention grooves,
a second rotor disk which is fixedly connected to the first rotor disk and has, distributed on the outer circumference, a plurality of second blade retention grooves penetrating the second rotor disk axially and has an encircling, axially extending second fastening projection arranged, on the side pointing toward the rotor axis, below the second blade retention grooves, and
a ring-shaped encircling rotor component which has, on one side, an encircling, axially opening first annular groove and, on an opposite side, an encircling, axially opening second annular groove, wherein the first fastening projection engages into the first annular groove and the second fastening projection engages into the second annular groove,
wherein, in a standstill state,
a first groove outer flank of the first annular groove bears under contact pressure against a first projection outer flank of the first fastening projection,
a clearance is present between a first groove inner flank of the first annular groove and a first projection inner flank of the first fastening projection,
a clearance is present between a second groove outer flank of the second annular groove and a second projection outer flank of the second fastening projection, and
a clearance is present between a second groove inner flank of the second annular groove and a second projection inner flank of the second fastening projection.

2. The rotor as claimed in claim 1,
wherein, in a first transition state in the presence of a first rotational speed lower than an intended nominal rotational speed,
the first groove outer flank bears against the first projection outer flank,
the clearance is present between the first groove inner flank and the first projection inner flank,
the clearance is present between the second groove outer flank and the second projection outer flank, and
the second groove inner flank bears against the second projection inner flank.

3. The rotor as claimed in claim 2,
wherein, in a second transition state in the presence of a second rotational speed higher than the first rotational speed and lower than the intended nominal rotational speed,
the clearance is present between the first groove outer flank and the first projection outer flank,
the clearance is present between the first groove inner flank and the first projection inner flank,
the clearance is present between the second groove outer flank and the second projection outer flank, and
the second groove inner flank bears under contact pressure against the second projection inner flank.

4. The rotor as claimed in claim 2,
wherein the first rotational speed is between 0.2 times and 0.6 times the nominal rotational speed.

5. The rotor as claimed in claim 1,
wherein, in the presence of an installation temperature of the ring-shaped rotor component of at least 100° C. and at most 200° C.,
a contact pressure between the first groove outer flank and the first projection outer flank corresponds to at most 10% of the contact pressure at room temperature, and
a contact pressure between the first groove inner flank and the first projection inner flank corresponds to at most 10% of the contact pressure between the first groove outer flank and the first projection outer flank at room temperature.

6. The rotor as claimed in claim 1,
wherein the rotor component has a covering portion extending in a circumferential direction and radially, which covers the first blade retention grooves at least in sections and bears with a support surface against an end surface of the first rotor disk in a region between the blade retention grooves.

7. The rotor as claimed in claim 6,
wherein the support surface bears under contact pressure, with elastic deformation of the covering portion, against the end surface.

8. The rotor as claimed in claim 7,
wherein, in the presence of an installation temperature of the rotor component of at least 100° C. and at most 200° C., the contact pressure of the support surface against the end surface corresponds to at most 10% of the contact pressure at room temperature.

9. A method for installing the rotor as claimed in claim 1, comprising:
providing the first rotor disk;
heating up the rotor component to an installation temperature of at least 100° C. and at most 200° C.;
placing and/or pressing the rotor component onto the first rotor disk with contact of a support surface against an end surface;
pushing the rotor component further onto the first rotor disk until a predefined expansion spacing between a first projection end surface of the first fastening projection and a first groove base of the first annular groove is attained;
cooling the rotor component and, in the process, holding the first rotor disk and the rotor component together; and
placing and/or pressing the second rotor disk onto simultaneously the first rotor disk and the rotor component.

10. The rotor as claimed in claim 1,
wherein the rotor comprises a gas turbine rotor.

11. The rotor as claimed in claim 1,
wherein, in the presence of an intended nominal rotational speed,
the clearance is present between the first groove outer flank and the first projection outer flank,
the first groove inner flank bears under contact pressure against the first projection inner flank
a clearance is present between a second groove outer flank and a second projection outer flank, and
a second groove inner flank bears under contact pressure against the second projection inner flank.

12. The rotor as claimed in claim 1,
wherein, after installation of the rotor, and at least prior to a heating-up of the rotor, a free first expansion spacing is present between a first projection end surface of the first fastening projection and a first groove base of the first annular groove, wherein the first expansion spacing amounts to at least 0.5 mm and at most 5 mm.

13. A rotor, comprising:
a first rotor disk which has, distributed on an outer circumference, a plurality of first blade retention grooves penetrating the first rotor disk axially and has an encircling, axially extending first fastening projection arranged, on a side pointing toward a rotor axis, below the first blade retention grooves,
a second rotor disk which is fixedly connected to the first rotor disk and has, distributed on the outer circumference, a plurality of second blade retention grooves penetrating the second rotor disk axially and has an encircling, axially extending second fastening projection arranged, on the side pointing toward the rotor axis, below the second blade retention grooves, and
a ring-shaped encircling rotor component which has, on one side, an encircling, axially opening first annular groove and, on an opposite side, an encircling, axially opening second annular groove, wherein the first fastening projection engages into the first annular groove and the second fastening projection engages into the second annular groove,
wherein, in a standstill state,
a first groove outer flank of the first annular groove bears under contact pressure against a first projection outer flank of the first fastening projection,
a clearance is present between a first groove inner flank of the first annular groove and a first projection inner flank of the first fastening projection,
wherein, in the presence of an intended nominal rotational speed,
the clearance is present between the first groove outer flank and the first projection outer flank,
the first groove inner flank bears under contact pressure against the first projection inner flank
a clearance is present between a second groove outer flank and a second projection outer flank, and
a second groove inner flank bears under contact pressure against the second projection inner flank.

14. A rotor, comprising:
a first rotor disk which has, distributed on an outer circumference, a plurality of first blade retention grooves penetrating the first rotor disk axially and has an encircling, axially extending first fastening projection arranged, on a side pointing toward a rotor axis, below the first blade retention grooves,
a second rotor disk which is fixedly connected to the first rotor disk and has, distributed on the outer circumference, a plurality of second blade retention grooves penetrating the second rotor disk axially and has an encircling, axially extending second fastening projection arranged, on the side pointing toward the rotor axis, below the second blade retention grooves, and
a ring-shaped encircling rotor component which has, on one side, an encircling, axially opening first annular groove and, on an opposite side, an encircling, axially opening second annular groove, wherein the first fastening projection engages into the first annular groove and the second fastening projection engages into the second annular groove,
wherein, in a standstill state,
a first groove outer flank of the first annular groove bears under contact pressure against a first projection outer flank of the first fastening projection,
a clearance is present between a first groove inner flank of the first annular groove and a first projection inner flank of the first fastening projection,
wherein the ring-shaped rotor component has a covering portion extending in a circumferential direction and radially, which covers the first blade retention grooves at least in sections and bears with a support surface against an end surface of the first rotor disk in a region between the blade retention grooves;
wherein the support surface bears under contact pressure, with elastic deformation of the covering portion, against the end surface; and
wherein, in the presence of an installation temperature of the rotor component of at least 100° C. and at most 200° C., the contact pressure of the support surface against the end surface corresponds to at most 10% of the contact pressure at room temperature.

15. A rotor, comprising:
a first rotor disk which has, distributed on an outer circumference, a plurality of first blade retention grooves penetrating the first rotor disk axially and has an encircling, axially extending first fastening projection arranged, on a side pointing toward a rotor axis, below the first blade retention grooves,
a second rotor disk which is fixedly connected to the first rotor disk and has, distributed on the outer circumference, a plurality of second blade retention grooves penetrating the second rotor disk axially and has an encircling, axially extending second fastening projection arranged, on the side pointing toward the rotor axis, below the second blade retention grooves, and a ring-shaped encircling rotor component which has, on one side, an encircling, axially opening first annular groove and, on an opposite side, an encircling, axially opening second annular groove, wherein the first fastening projection engages into the first annular groove and the second fastening projection engages into the second annular groove, wherein, in a standstill state, a first groove outer flank of the first annular groove bears under contact pressure against a first projection outer flank of the first fastening projection, a clearance is present between a first groove inner flank of the first annular groove and a first projection inner flank of the first fastening projection, wherein, after installation of the rotor, and at least prior to a heating-up of the rotor, a free first expansion spacing is present between a first projection end surface of the first fastening projection and a first groove base of the first annular groove, wherein the first expansion spacing amounts to at least 0.5 mm and at most 5 mm.

16. The rotor as claimed in claim 15, wherein a free second expansion spacing or contact is present between a second projection end surface of the second fastening projection and a second groove base of the second annular groove, wherein the second expansion spacing corresponds to at most 0.2 times the first expansion spacing.

17. The rotor as claimed in claim 15, wherein the first expansion spacing amounts to at least 1 mm and at most 2.5 mm.

* * * * *